United States Patent [19]

Kaplan et al.

[11] 4,224,958
[45] Sep. 30, 1980

[54] VALVE DEVICE FOR DIVERTING AND COMBINING FLUID FLOWS

[76] Inventors: Stephen J. Kaplan, 4420 Cezanne Ave., Woodland Hills, Calif. 91364; Ladislaus S. Lengyel, 25623 Bellerise Dr., Valencia, Calif. 91355

[21] Appl. No.: 862,289

[22] Filed: Dec. 19, 1977

[51] Int. Cl.³ .................. F16K 11/06; F16K 49/00; F16K 3/02
[52] U.S. Cl. .................. 137/340; 137/625.11; 137/625.13; 137/625.15; 137/625.18; 137/625.46; 251/248; 251/304
[58] Field of Search .............. 137/340, 625.13, 625.15, 137/625.18, 625.46, 625.11; 251/248, 250.5, 304

[56] References Cited

U.S. PATENT DOCUMENTS

| | | | |
|---|---|---|---|
| 917,970 | 4/1909 | Smith et al. | 251/248 |
| 1,037,664 | 9/1912 | Rockwell | 137/625.11 |
| 1,375,205 | 4/1921 | Budzinsky | 137/625.15 |
| 2,878,829 | 3/1959 | Folmsbee | 251/248 X |
| 2,959,330 | 11/1960 | Charbonneau | 137/625.46 X |
| 3,455,357 | 7/1969 | Zink | |
| 3,727,767 | 4/1973 | Itter et al. | |
| 3,746,481 | 7/1973 | Schippers | |
| 3,763,891 | 10/1973 | Stiltner | 137/625.68 X |
| 3,817,668 | 6/1974 | Mayer et al. | |
| 3,833,121 | 9/1974 | Singleton et al. | |
| 4,019,535 | 4/1977 | Buckethal | 137/625.15 |

OTHER PUBLICATIONS

"Ram-Seal Diverter Valves", Publication of Fetterolf Corp., 4 pages.
"Care and Maintenance of Zenith High Temperature Metering Pumps", 12 pages.
Beringer Catalog, Publication of Beringer Co., Inc., 1976, 16 pages.

Primary Examiner—Gerald A. Michalsky
Attorney, Agent, or Firm—Robert J. Schaap

[57] ABSTRACT

A valve device for controlling the flow of a fluid. In a first embodiment, the valve device is designed to control the flow of a fluid, particularly a hot plastic liquid melt. The valve device comprises a first upper plate and a second lower plate with a third plate interposed between the first and second plates. The first and second plates and the third plate are provided with planar surfaces such that sealing gaskets are not required. In addition, the first and second plates are each provided with an annular protrusion, while the third plate is provided with an annular recess on each of the flat faces thereof to accommodate the protrusions on each of the plates in order to reduce the surface area of plate engagement. The first and second plates are each provided with first and second openings which extend through the protrusion, and the third plate is provided with a pair of apertures located through the recesses. The third plate can be shifted relative to the first and second plates such that the openings between the first and second plates become aligned and communicate with the apertures in the third plate. Material flowing through the first openings or the second openings can be proportionally varied by adjusting the position of the third plate. A heat controlling fluid can be introduced into a heat regulating chamber surrounding the portions of the plates and can pass through center portions of each of the plates, thereby ensuring complete temperature control of the fluid passing through the valve.

16 Claims, 12 Drawing Figures

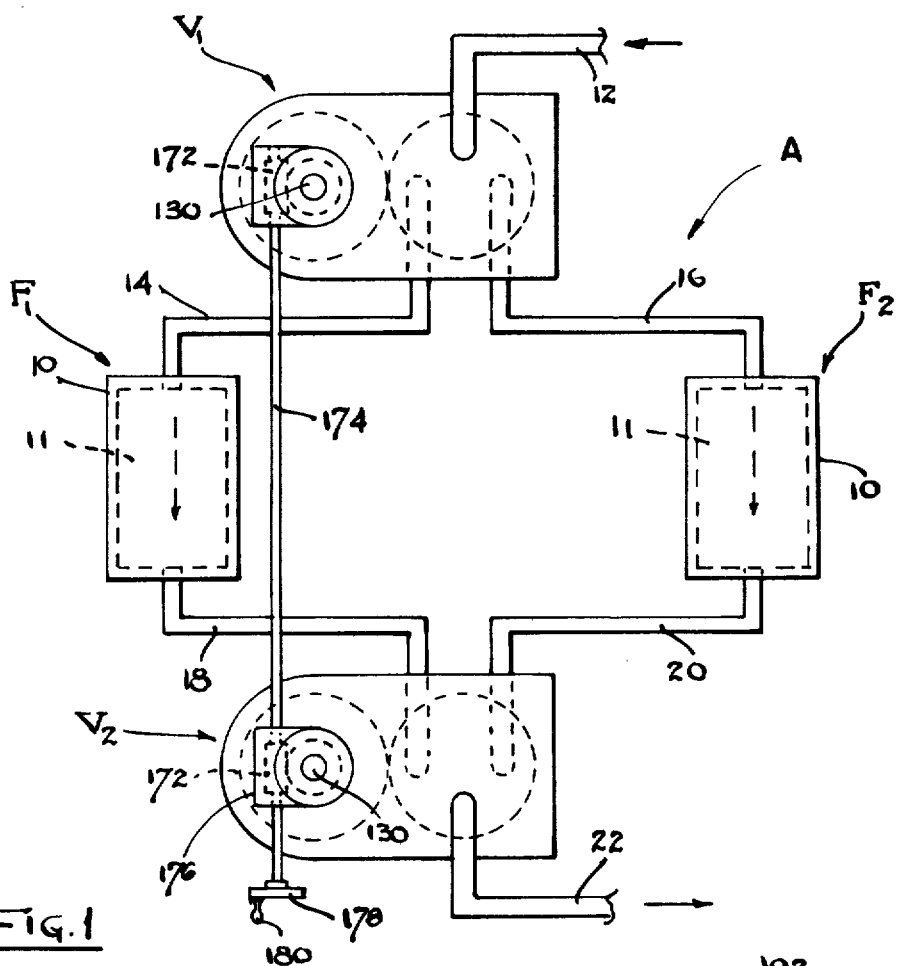
Fig. 1
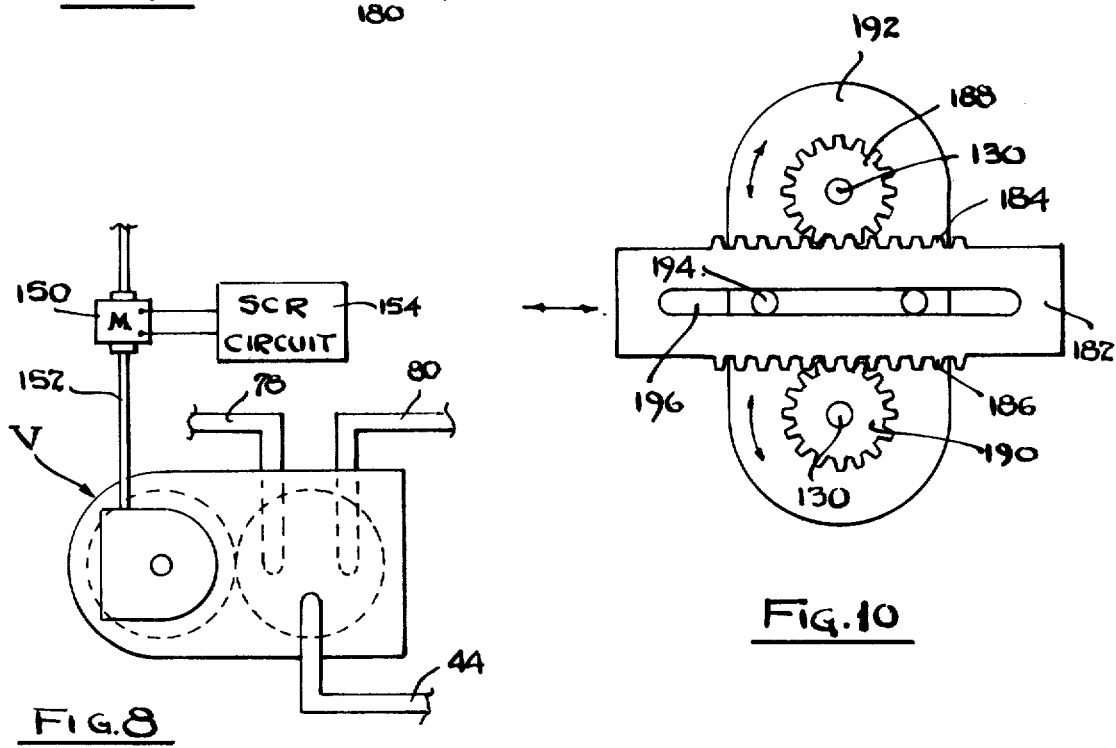
Fig. 8
Fig. 10

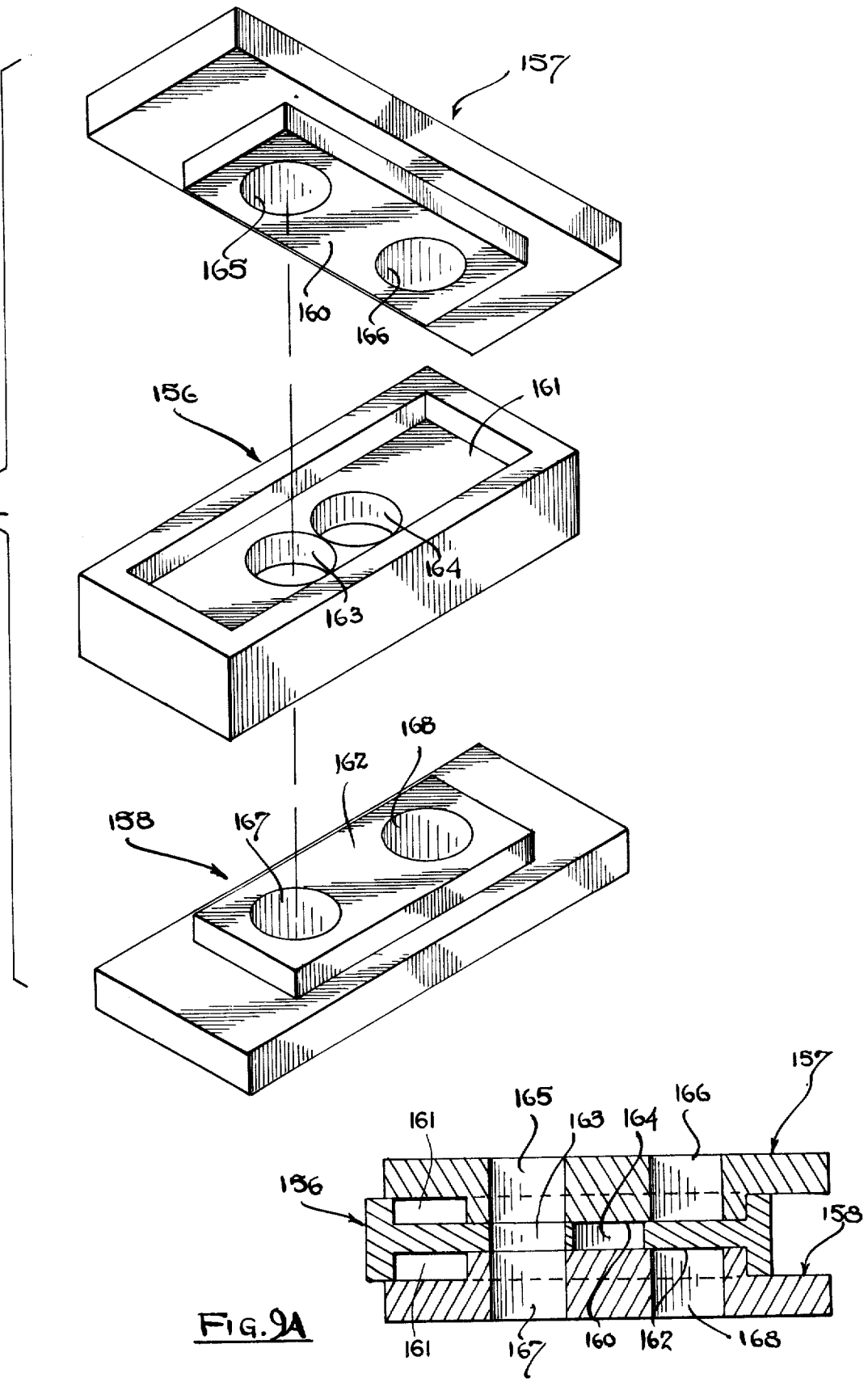

VALVE DEVICE FOR DIVERTING AND COMBINING FLUID FLOWS

BACKGROUND OF THE INVENTION

1. Purposes of the Invention

This invention relates in general to certain new and useful improvements in valve systems for controlling the flow of temperature regulated fluids, and, more particularly, to unique valve systems which permit diversion of temperature regulated fluids through a pair of fluid passages in the valve.

2. Brief Description of the Prior Art

In the processing of high viscosity, high temperature liquids, and especially thermoplastic and thermosetting polymer melts, it is necessary to pass the liquid plastic melt or other liquid material through filters. These plastic polymers contain many impurities which result in periodic clogging of the filters and, therefore, the necessary attendant cleaning of the filters. Accordingly, in the processing of these plastic liquid melts, whether monomeric or polymeric, two or more filters in parallel streams are often employed in a process such that one of the filters in one stream may be shut down for temporary cleaning with the other filter being operative in the other process stream.

Due to the necessity of two or more filters, valving arrangements are required in order to control the flow of the plastic liquid melt to the respective filters. Even moreso, it is well recognized that the liquid flow cannot be immediately shut off with respect to one filter and immediately diverted to another filter. Accordingly, the liquid flow is proportionally reduced to one of the filters with a proportional increase to the other of the filters until the flow has been completely diverted from one filter to another.

Presently, various forms of conventional plug valves, ball valves, spool valves, ram valves and the like are used in order to control the flow of a hot thermoplastic or thermosetting liquid melt. These valves are all of essentially conventional construction and are not very effective for purposes of controlling hot thermoplastic or thermosetting liquid melts, particularly of high viscosity, as for example, 1000 poise, and greater.

Notwithstanding the problems in controlling the fluid flow by means of valves, the valves as well as the fluid lines which carry the hot liquid plastic must be heat sealed. Moreover, the valves and fluid lines must be provided with a means for regulating the temperature of the hot thermoplastic melt during processing. Thus, for example, the various lines which carry the thermoplastic melt may be jacketed for receiving a suitable temperature maintaining or so-called "heat regulating" fluid. In addition, it is necessary to provide valves which contain jackets for receiving a heat regulating liquid to thereby maintain the liquid hot melt at a desired temperature during the processing.

Most of the conventional valves now used typically employ an outer jacket surrounding portions of the valve which receive a heat regulating fluid typically designed to apply heat to the valve and hence the plastic liquid melt passing through the valve. This arrangement has not proved to be too effective inasmuch as only the outer portions of the valve are heated.

Various forms of valves which have been used in the past are described in the Mayer et al. U.S. Pat. No. 3,817,668 and the Schippers U.S. Pat. No. 3,746,481. These patents describe valves which use gear wheels as a means of controlling the fluid flow, but constitute nothing more than conventional metering valves. However, here again, they have not proved to be fully effective in controlling the flow of hot liquids and particularly hot plastic liquid melts. Even moreso, they are not capable of operating as diverter valves.

U.S. Pat. No. 3,455,357 to J. Zink discloses a screen changer apparatus for extrusion machines. The screen changer device includes a shiftable plate which is capable of being shifted with respect to a pair of flow paths in order to divert flow during a screen changeover operation. However, this patent does not disclose an effective arrangement operable as a valve where an intermediate plate disposed between a pair of fixed plates is shiftable between such pair of plates in order to permit fluid flow through openings formed in the plates. In addition, the device is constructed so that venting must occur after changing a screen in order to permit effective operation of the device.

U.S. Pat. No. 3,727,767 to Itter et al. proposes a combination filter and valve arrangement in which two parallel filter-valve arrangements are employed. However, one of the major problems with this form of arrangement is that it is quite difficult to shut off the flow to one of the filters while maintaining the flow to the other of the filters. In addition, each filter-valve arrangement is quite complex in its construction, thereby necessitating almost complete disassembly of the valve-filter arrangement in order to clean the filter portion thereof. Notwithstanding the above, it has been found that this form of valve-filter arrangement has not been very effective in maintaining the liquid plastic melt at a desired temperature during the filtering thereof.

There have been many proposed dual filter arrangements in addition to that described in the Itter al. patent. For example, in British Pat. No. 1,168,063, removable filter pots are employed in the valve with stop cock or rotary slice valve arrangements. One of the principal problems in the aforesaid British patent, as well as the other prior art valve arrangements, is that after fluid flow is stopped through the valve, there is a standing amount of liquid polymer melt contained within the valve. This is highly undesirable inasmuch as the standing liquid melt tends to harden and thereby requires almost complete disassembly of the valve in order to clean the same. Most of the prior art valves do not afford any means for removing the remaining liquid melt in the valve after it has been turned to the "off" position, thereby stopping the flow of liquid polymer melt therethrough. In most conventional prior art valves, various forms of seals are used in the valve arrangement as in valves controlling the passage of low viscosity, low temperature fluids. However, when the valve is used for controlling the flow of a high viscosity, high temperature fluid, as for example, a hot thermoplastic liquid melt, this hot fluid has a tendency to cause deterioration of the seals in a relatively short time span. There has not been any valve arrangement which provides an effective seal which does not require a constant replacement.

OBJECTS OF THE INVENTION

It is, therefore, the primary object of the present invention to provide a unique valve device for controlling the flow of a liquid which employs a plurality of plates in stacked arrangement, with one of said plates being movable with respect to another of the plates and having gear means for regulating relative positions of the two plates and hence liquid flow through the plates.

It is another object of the present invention to provide a valve device of the type stated when the plates have surface finished mating surface portions engaging each other, thereby avoiding the necessity of conventional seals.

It is a further object of the present invention to provide a valve device of the type stated which can be designed for control of high viscosity, high pressure fluid flow or low viscosity, low pressure liquid flow.

It is yet another object of the present invention to provide a valve device of the type stated which can be partially disassembled, even during operation thereof.

It is yet a further object of the present invention to provide a valve device of the type stated which is capable of having standing liquid melt drained therefrom during non-use conditions of the valve.

It is an additional object of the present invention to provide a valve device of the type stated in which a liquid plastic melt passing through the valve can be entirely heated, both on the exterior surface of the valve device and on the interior thereof by a heat regulating fluid.

It is also an object of the present invention to provide a valve device of the type stated in which the valve can be easily disassembled without requiring a considerable amount of manual attention and a long time period for disassembly.

It is another salient object of the present invention to provide a valve system which operates in conjunction with a pair of filters for filtering a hot liquid plastic melt such that the valves on the inlet and outlet sides of the filters can be controlled in a time-related manner in order to control the proportional liquid flow between the various filters.

It is still another object of the present invention to provide a method of controlling the flow of a temperature regulated, viscosity controlled liquid through a valve by shifting one plate interposed between a pair of spaced apart plates in such manner that conventional seals are not required.

It is still a further object of the present invention to provide a method of controlling the flow of a high viscosity, high temperature liquid between two parallel filters by means of a pair of valves which are operated in a time-related manner.

With the above and other objects in view, our invention resides in the novel features of form, arrangement and combination of parts presently described and pointed out in the claims.

SUMMARY OF THE DISCLOSURE

A valve device for controlling the flow of a high viscosity, high temperature fluid, such as a hot plastic liquid melt. The valve device is normally used in a system where the liquid melt can be diverted into two or more fluid streams which are then processed, as for example, by filtering of the streams. Due to the nature of the hot plastic liquid melt, the liquid material often has a tendency to clog the filters, thereby necessitating the stopping of the liquid flow and cleaning of the filter. In this case, the liquid is diverted from one liquid stream into another liquid stream where the second of the liquid streams will also have a filter capable of continuing the filtering operation without shutting down the entire system.

The valve device of the present invention comprises three plates, the first or uppermost of which is provided with a pair of openings and the second or lowermost of which is also provided with a pair of openings in alignment with the openings in the first plate. A third plate is interposed between the first and second plates. The third plate is provided with elongate apertures permitting selective communication between the first and second openings in each of the first and second plates. The apertures in the third plate are so located so that only the first openings in the first and second plates, or only the second openings in the first and second plates, can be in complete communication at any point in time. Thus, the second fluid stream would be completely stopped when the first fluid passage is completely open. In order to shift the flow from the first fluid passage to the second fluid passage, the third plate is shifted relative to the first and second plates such that the flow of liquid melt is increased through the second fluid passage and the flow is proportionally decreased in the first fluid passage until the entire flow occurs through the second fluid passage.

In one aspect of the present invention, the third or intermediate plate is rotated between the first and second plates, and the apertures are located in a circularly shaped recess formed on both of the flat surfaces thereof. In another embodiment of the present invention, the two apertures in the third plate are located in an elongate longitudinal recess and, in this case, the third plate is shifted in a reciprocative manner relative to the first and second plates.

The valve device of the present invention does not require any form of seal inasmuch as the underside of the upper plate and the upper surface of the lower plate, as well as both surfaces of the intermediate plate, are highly polished or surface finished around the opening. These surface finishes with a high degree of linearity provide the necessary sealing action for the type of liquid which is being controlled, namely a high viscosity liquid. In a preferred aspect of the invention, an annular upstanding protrusion is formed on the lower flat surface of the upper or first plate and a similar protrusion is found on the upper flat surface of the lower or second plate. The openings in the first and second plates extend through the protrusions. Moreover, the protrusions fit into the recesses with the apertures therein on the third plate. In this way, it is not necessary to surface finish the entire planar surfaces of each of the plates.

The valve device of the present invention is also unique in that it is provided with an upper heat controlling fluid chamber and a lower heat controlling fluid chamber and which communicate with each other through a central bore formed in the valve device. In this way, a heat controlling fluid can essentially flow around all portions of the valve which receive the liquid melt, thereby maintaining a high degree of heat controlling fluid interface.

The valve device of the present invention is also uniquely constructed so that it can be easily disassembled by simple removal of several bolts and guide pins. In accordance with the construction, a drain plug for receiving the temperature controlling fluid can be removed and an implement can be inserted through the opening receiving the drain plug to engage the central shaft and thereby cause the separation of the three plates.

The position of the third plate can be controlled by a gear wheel which is in meshing engagement with a gear segment on the third plate. The rotation or other longitudinal shifting movement of the third plate depending upon which form of aperture is used is accomplished by means of manual rotation of the gear wheel. In addition, the invention also provides means for automatically controlling the position of the third plate through an electrical circuit including a silicon controlled rectifier drive.

The present invention also is unique in that a pair of valves can be controlled automatically by adjusting the position of the third plate in one of the valves. In this way, the position of the third plate in the other of the valves is automatically controlled.

The valve device of the present invention is uniquely constructed so that it can be used for the control of fluid-low viscosity, low pressure fluids such as plastic monomers or other liquids. Nevertheless, the valve device is equally effective in controlling, and more particularly, in diverting fluid flow, while still maintaining the same advantages of temperature control, easy disassembly and drain of excess of standing liquid.

BRIEF DESCRIPTION OF THE DRAWINGS

Figure 2:
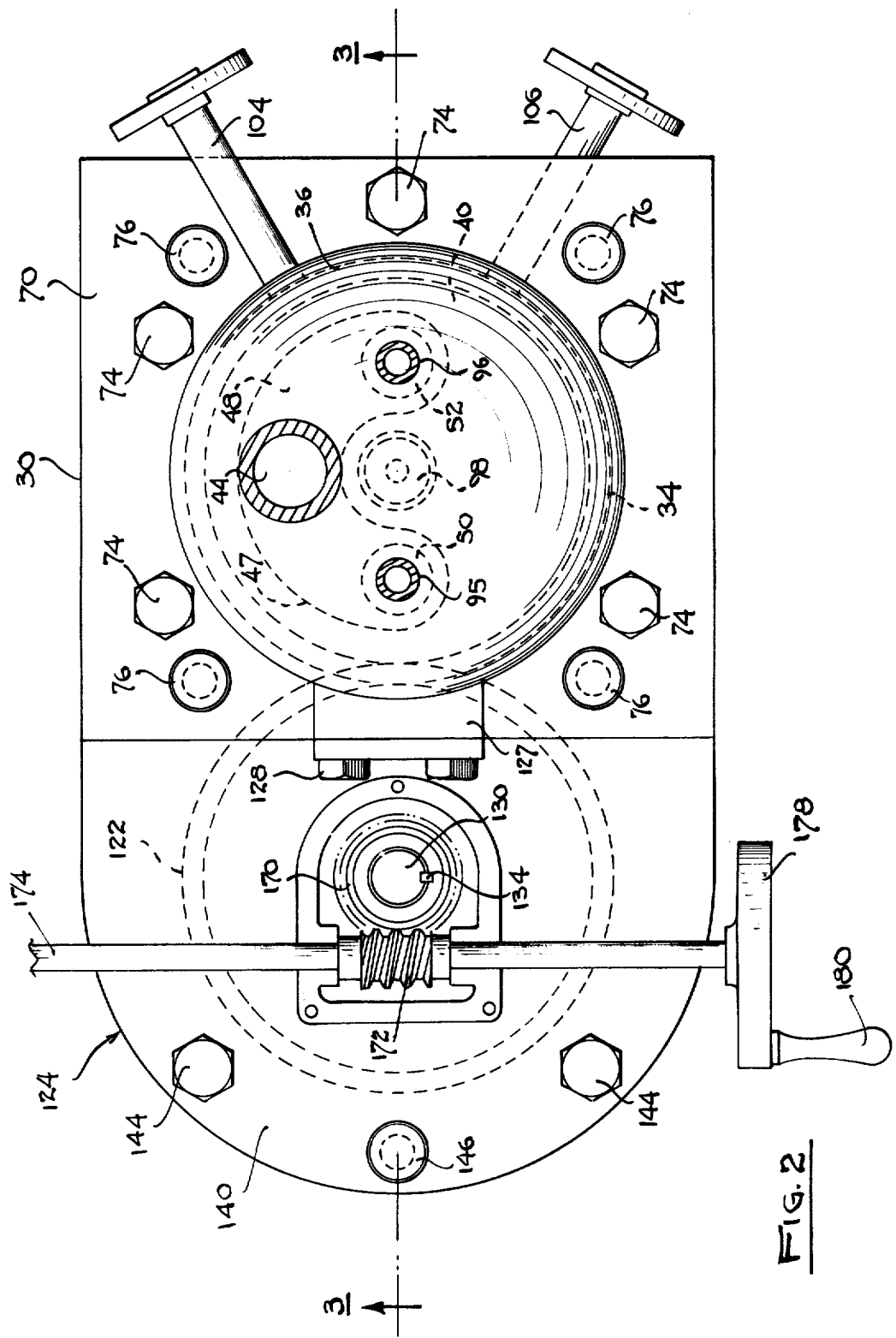
Figure 3:
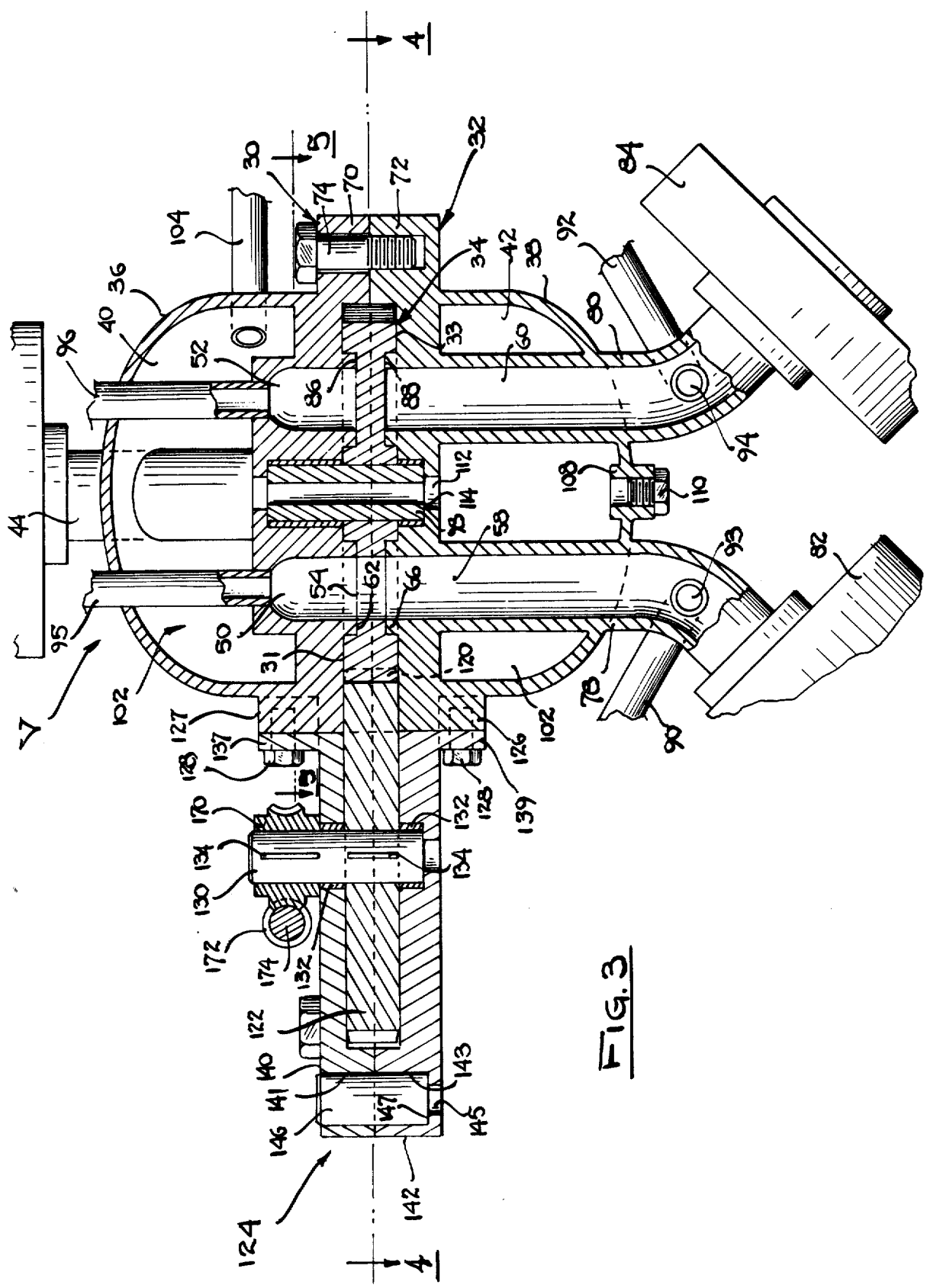
Figure 4:
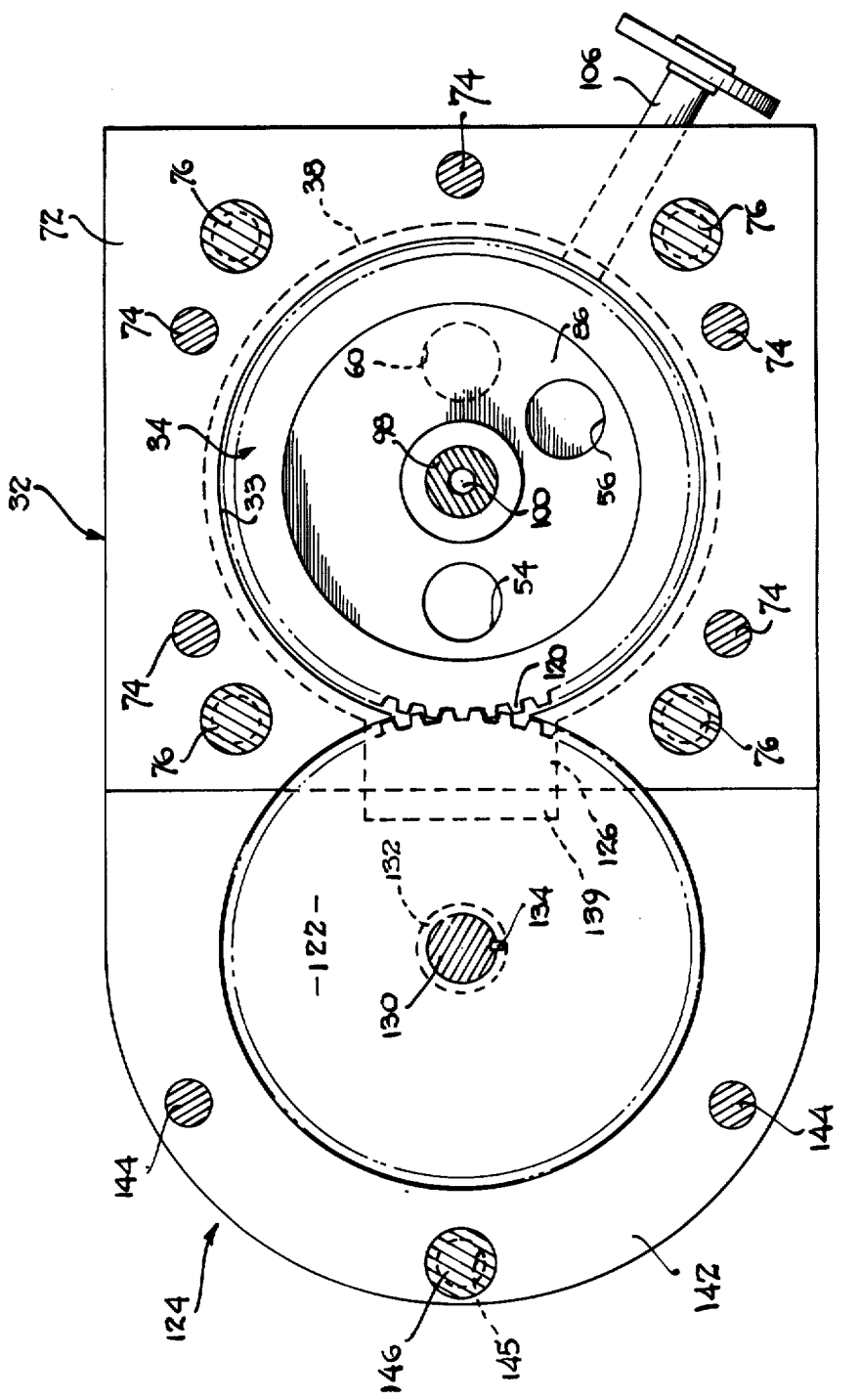
Figure 5:
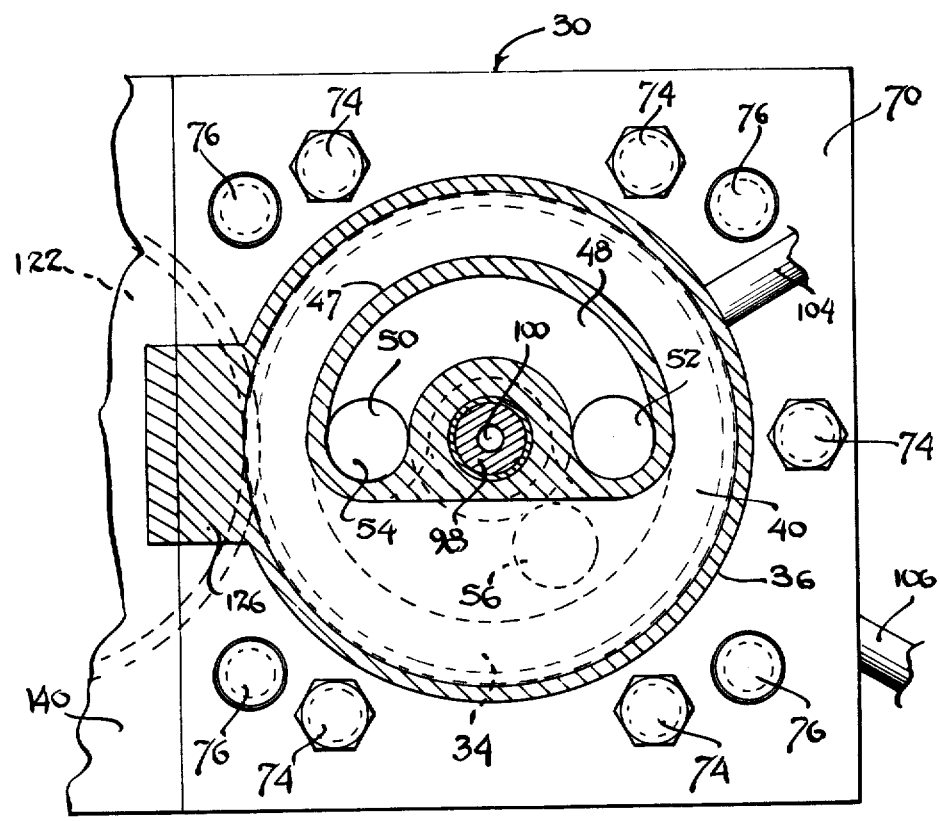
Figure 6:
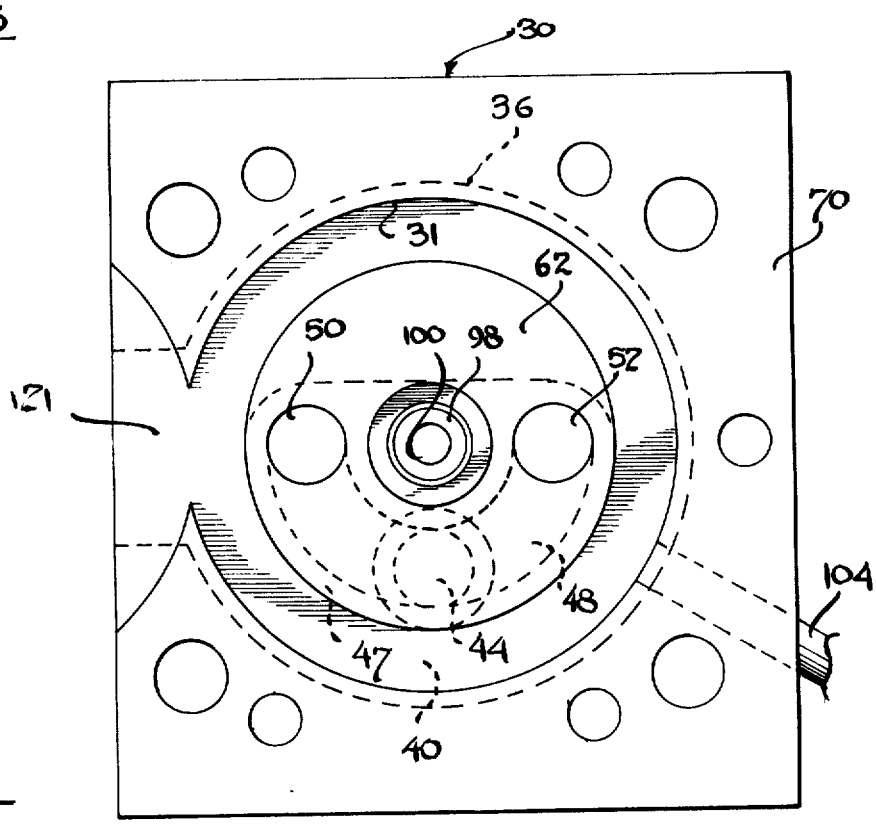
Figure 7:
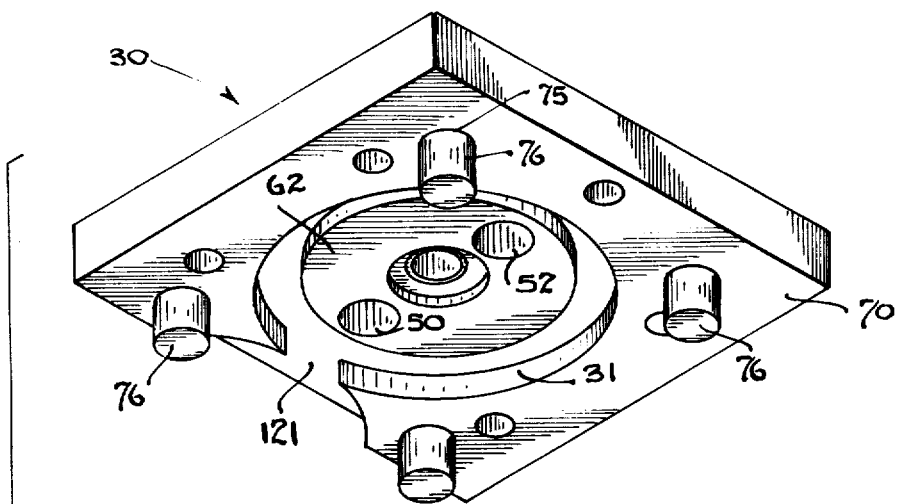
Figure 7:
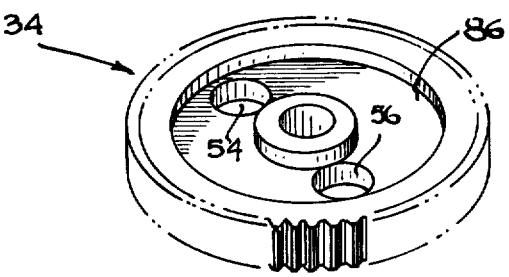
Figure 9B:
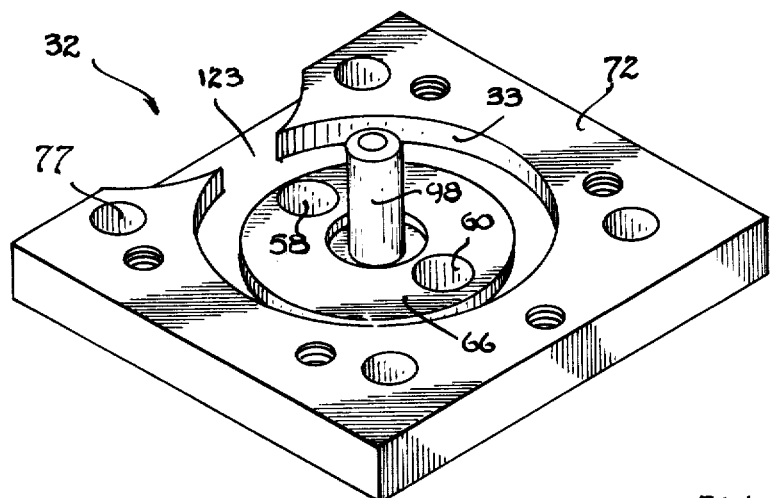
Figure 9B:
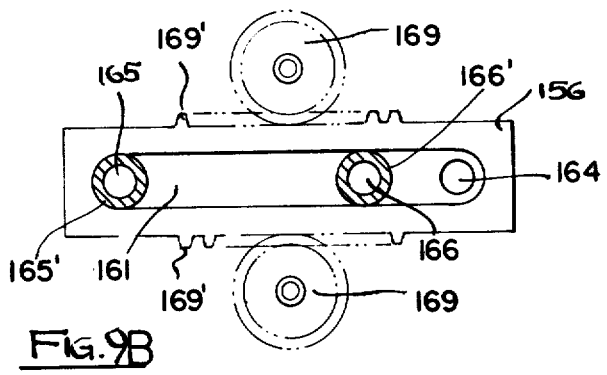
Figure 11:
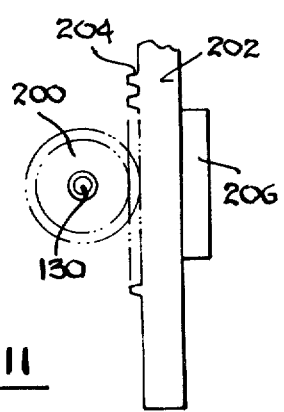

Having thus described the invention in general terms, reference will now be made to the accompanying drawings in which:

FIG. 1 is a schematic view showing a pair of valves constructed in accordance with and embodying the present invention in relation to a pair of filters for filtering high viscosity, high temperature fluids;

FIG. 2 is a top plan view, partially broken away and in section, of a valve device constructed in accordance with and embodying the present invention;

FIG. 3 is a vertical sectional view taken along line 3—3 of FIG. 2;

FIG. 4 is a horizontal sectional view, taken along line 4—4 of FIG. 3;

FIG. 5 is a fragmentary top plan view showing the position of one of the plates forming part of the valve mechanism in a certain fluid flow position;

FIG. 6 is a bottom plan view of the uppermost of the plates without the valve casing;

FIG. 7 is an exploded perspective view showing the three plates forming part of the valve mechanism and portions of the construction thereof and the basis of the mating arrangement;

FIG. 8 is a schematic side-elevational view showing a form of valve arrangement operated by an electrical circuit drive;

FIG. 9 is a schematic exploded perspective view of another modified form of mechanism used in the valve device of the present invention, utilizing a shiftable plate having openings for fluid control and diversion;

FIG. 9A is a vertical sectional view showing the three plates of FIG. 9 in the assembled relationship;

FIG. 9B is a somewhat schematic top plan view partially in section and showing a modified form of valve mechanism, somewhat similar to that illustrated in FIGS. 9 and 9A;

FIG. 10 is a top plan view of a modified form of mechanism used in the valve device of the present invention, utilizing a longitudinal shifting plate; and FIG. 11 is a top plan view of a mechanism having a rack drive for controlling a pair of valves in timed relationships.

DETAILED DESCRIPTION OF THE PREFERRED EMBODIMENTS

Referring now in more detail and by reference characters to the drawings which illustrate practical embodiments of the present invention, A designates a valve system employing a conventional pair of filters and in which two valves V of the present invention are employed. In this case, the system A comprises a first valve $V_1$ and a second $V_2$ which are operated in conjunction with filters $F_1$ and $F_2$.

The filters $F_1$ and $F_2$ are generally of conventional construction and include an outer cylindrical canister 10 having a conventional filter unit 11 included therein, and shown in dotted lines in FIG. 1. The filter unit is designed to filter high temperature, high viscosity fluids, such as hot thermoplastic liquid melts. The valve $V_1$ is provided with a fluid inlet pipe 12 carrying a hot liquid thermoplastic melt and which is diverted in the valve into two fluid streams 14 and 16, one of which is directed as an inlet to the filter $F_1$ and the other of which is directed as an inlet to the filter $F_2$. The hot thermoplastic liquid melt which passes through the filters $F_1$ and $F_2$ is then introduced into outlet pipes 18 and 20 which are, in turn, respectively connected to inlets to the valve $V_2$ and the latter is again provided with a discharge pipe 22. In this respect, it can be observed that the pipes 12, 14, 16, 18, 20 and 22 could all be provided with conventional heat insulation, and preferably jackets disposed therearound, for receiving a heating fluid to circulate around the various pipes.

The valves $V_1$ and $V_2$ operate in conjunction with each other and in a time-related manner in order to proportionately divert fluid flow between the filters $F_1$ and $F_2$. Thus, while fluid flow is increased through the outlet pipe 16 and decreased through the outlet pipe 14, the valve $V_2$ controls the inlet of fluid flow through the pipes 18 and 20. In this way, the amount of hot liquid thermoplastic melt introduced through the inlet pipe 12 is equal to the amount passing through the discharge pipe 22, although the valves $V_1$ and $V_2$ control liquid flow so that the amount passing through the filter $F_1$ is inversely proportional to the amount passing through the filter $F_2$. The construction to accomplish this arrangement is hereinafter described in more detail.

The valves $V_1$ and $V_2$ are essentially identical in their construction, and one of such valves V is more fully illustrated in FIGS. 2–6 of the drawings. The valve V generally comprises a first or upper plate 30 and a second or lower plate 32. An intermediate or third plate 34 is interposed between the plates 30 and 32 and being received in recessed areas 31 and 33, respectively, in the upper and lower plates 30 and 32, in the manner as illustrated in FIGS. 3 and 7 of the drawings. In this case, the third plate 34 is cylindrically shaped in the form of a disc.

Referring now to FIG. 3, the upper plate 30 is integrally formed with an upper jacket section 36 and the lower plate 32 is integrally formed with a lower jacket section 38. The upper jacket 36 forms an interior heat regulating fluid chamber section 40 and the lower jacket section 38 forms a lower heat regulating fluid chamber 42. It should be understood in this regard that the jackets 36 and 38 could be welded or otherwise secured to portions of the upper and lower plates 30 and 32, respectively, as opposed to being integrally formed therewith.

The hot polymer melt is introduced into the valve V through an inlet pipe 44 which passes through the jacket 36 in the manner as illustrated in FIGS. 2 and 3. The inlet pipe 44 is connected to a semicircular shaped manifold 47 having a manifold chamber 48, as best seen in FIGS. 2, 5 and 6, and which provides for the flow of the hot polymer melt to a first liquid passage 50 and a second liquid passage 52 in the plate 30. As an alternative, the manifold could be constructed with a full circular shape so that it is continuous and extends for 360°. The liquid passage 50 is capable of communicating with a first opening or port 54 in the intermediate plate 34. Likewise, the second passage 52 is capable of communicating with a second opening or port 56 in the third plate 34. The second plate 32 is similarly provided with a first opening 58 capable of being aligned with the opening 56, and the second plate 32 is also provided with a second opening 60 capable of being aligned with the opening 56 in the third plate in the manner as illustrated in FIG. 4 of the drawings.

The first or upper plate 30 is provided with a downwardly projecting circularly shaped annular boss or so-called "projection" 62 which fits within a corresponding circularly shaped recess or slot 86 as formed in the upper flat face of the intermediate plate 34, in the manner as illustrated in FIGS. 3, 4 and 5 of the drawings. In like manner, the second plate is provided with an upwardly extending circularly shaped annular boss or so-called "projection" 66 which fits within a corresponding circularly shaped recess or slot 88 as formed on the lower flat face of the intermediate plate 34. These recesses 86 and 88 are each located somewhat midway between the center of the intermediate plate 34 and the periphery thereof and have a width sufficient to accommodate the bosses 62 and 66 in the manner as illustrated in FIGS. 3, 4 and 7. At least the bosses 62 and 66 are relatively planar where they mate with corresponding surfaces of the plate 34.

The pair of arcuately shaped recesses 86 and 88 are located opposite of the plate 34, and the openings 54 and 56 extend through the recesses areas 86 and 88. In like manner, the liquid passages 50 and 52 extend through the first plate 30 and the annular boss 62 thereon, and the openings 58 and 60 extend through the second plate 32 and the annular boss 66 thereon, as best seen in FIGS. 3 and 7. This construction provides for respective communication between the openings 50 and 58 and the openings 52 and 60.

In addition, and in a preferred aspect, both the under surface of the first plate 30 and the upper surface of the second plate 32 are planar with respect to both the upper and lower surfaces of the intermediate plate 34. These mating surfaces are sufficiently surface finished and preferably planar so that they act as seals with respect to the viscosity and pressure and temperature of the fluid passing through the valve V. These relatively planar surfaces can be formed by milling or otherwise surface finishing the surfaces of the plates by well-known metal finishing operations with a high degree of linearity. In accordance with this construction, it is thereby possible to avoid seals which would otherwise surround the first openings 50 and 58, and seals which would otherwise surround the second openings 52 and 60.

It has been found in accordance with the valve construction of the present invention that the hot plastic liquid melt is sufficiently viscous and under sufficient pressure so that seals, such as flexible metal seals and the like, are not necessary as long as the surfaces surrounding the respective openings 50 and 58 and the respective openings 52 and 60 are sufficiently planar. In this way, the three plates cooperate with each other to form the necessary sealing arrangement. Notwithstanding, the intermediate plate 34 is movable with respect to the upper plate 30 and the lower plate 32, in a manner to be hereinafter described in more detail.

The upper surfaces of the boss 66 on the second plate and the lower surfaces of the boss 62 on the first plate, namely the contact surfaces or seal surfaces, are relatively flat as shown in FIGS. 3 and 7. In the preferred embodiment, the surfaces of these bosses where they are in contact with the third or intermediate plate are planar. However, the bosses could adopt a shape conforming to the third plate at the regions where they are in sliding contact with the intermediate plate 34. The surfaces of the bosses will be surface finished by well-known techniques and preferably will have a 16 RMS or better finish such that the contact surfaces of the bosses will have lapped surfaces.

This type of surface finish is sufficient for effective sealing of high viscosity and high pressure and high temperature liquids such as hot thermoplastic and thermo-setting liquid melts. As used herein, high viscosity polymers or liquids generally have a viscosity range of about 50 poise or lower to about 50,000 poise or higher. Low viscosity polymers or liquids generally have a viscosity in the range of water or mineral oils and generally from about one to about one hundred centipoise or higher. The high pressures used for such liquids generally range about 500 psi or lower to about 5,000 psi and higher, and low pressures for low pressure liquids would be about 50 psi or even less to about 1,000 psi. The term high temperature for such liquids as used herein generally means about temperature ranges from about 400° F. or lower to about 650° F. or higher. Low temperature for such liquids as used herein generally means temperature ranges of about 200° F. to about 600° F. or higher.

It is also possible to control the flow of liquids other than polymers and monomers, as for example, coatings, adhesives, emulsions and the like. Generally, these liquids have a viscosity in the range of about one centipoise or lower to about 100 centipoise or higher with a pressure of about 20 psi or lower to about 150 psi or higher. These other liquids are normally processed at a temperature in the range of about 70° F. to about 300° F.

By further reference to FIGS. 2, 3, 5 and 6 of the drawings, it can be observed that the upper plate 30 and the lower plate 32 extend beyond the intermediate plate 34 and outwardly of the jacket sections 36 and 38. Thus, the upper plate 30 is provided with an outwardly extending peripheral section 70 and the lower plate 32 is provided with an outwardly extending peripheral section 72. These two outwardly extending sections 70 and 72 are secured together by means of bolts 74 which extend through the peripheral section 70 and are threadedly secured within the peripheral section 72. In this way, the bolts 74 can be removed for easy separation of the first plate 30 and the second plate 32.

The peripheral sections 70 and 72 are bored forming pin receiving apertures 75 in the upper plate 30 and pin receiving apertures 77 in the lower plate 32. Those pin receiving apertures are sized to accommodate cylindrically shaped locating pins or dowels 76 in order to maintain a proper alignment with respect to the plates 30 and 32 and also the interior plate 34. The locating pins 76 would have a slip fit in one of the plates and a press fit in the apertures in the other of the plates. Preferably, the pins would have a press fit in the lower plate 32 and a slip fit in the upper plate 30. The apertures 77 in the lower plate do not extend vertically through the lower second plate but terminate slightly above the lower surface of the lower plate 32. Relatively small diameter apertures communicate with the apertures 77 in a manner to be more fully described hereinafter. These locating pins are also highly effective for separating the three plates. It can be observed that the three plates with relatively planar surfaces would be difficult to separate. However, with the aid of the locking pins 76, it is merely necessary to remove the bolts 74 and thereafter tap on the top of the locking pins thereby causing separation of the upper and lower plates where they are in contact with each other.

By further reference to FIG. 3 of the drawings, it can be observed that the lower plate 32 is integrally provided with a first discharge tube 78 which communicates with the opening 58, and a second discharge tube 80 which communicates with the second opening 60. The discharge tubes 78 and 80 extend beyond the lower jacket section 38 and terminate in flange plates or so-called "mounting hubs" 82 and 84, respectively.

Referring now to FIGS. 3 and 4, it can be observed that when one of the openings 50 or 52 and one of the corresponding openings 58 or 60 is fully in open communication thru one of the ports 54 or 56, fluid flow will occur through the one of the passages and discharge tubes and not the other. Thus, considering FIG. 3, it is to be observed that the first opening 50 and the second opening 58 are in communication with each other through the port 54 such that full fluid flow will occur through the openings 50, the port 54 and the opening 58 and through the discharge pipe 78. In like manner, if the third plate 34 were rotated to the opposite end position, fluid flow would occur through the opening 52, through the port 56 and through the opening 60 into the discharge pipe 80.

In accordance with the above construction, it can be observed that the openings 54 and 56 are so located and so sized that the amount of fluid flow between the openings 50 and 58 is regulated with respect to the amount of fluid flow through the openings 52 and 60. Thus, as the fluid flow in the second openings 52 and 60 is increased, the fluid flow through the openings 50 and 58 is proportionally decreased. In this way, if it is desired to cut off the fluid flow through the openings 50 and 58, and hence through the discharge tube 78, the intermediate plate 34 is rotated slowly counter clockwise (FIG. 4) so that an increasing amount of fluid is passed through the openings 52 and 60, and hence through the discharge tube 80. In any event, the amount of fluid flow through the openings 50 and 58 is directly and inversely proportional to the amount of fluid flow through the openings 52 and 60.

Connected to the discharge pipes 78 and 80 are drain pipes, or so-called "flush-out pipes", 90 and 92, respectively, in the manner as illustrated in FIG. 3 of the drawings. In this case, it can be observed that if fluid flow is stopped to the valve V, or either one of the passages therein, as illustrated in FIG. 3, then the drain pipes 90 and 92 would permit discharge of any of the remaining fluid contained within the discharge pipes 78 or 80. The drain pipes 90 and 92 would be connected to any suitable collection medium for collecting the remaining amount of the liquid polymer within the discharge tubes 78 or 80. In this same respect, it can be observed, by reference to FIG. 3, that the drain pipes 90 and 92 are in fluid communication with the respective discharge tubes 78 and 80 by means of apertured connections 93 and 94, respectively.

Communicating with the passages 50 and 52, respectively, are upstanding drain pipes, or so-called "flush-out pipes", 95 and 96, and which extend beyond the upper jacket section 36. The flush-out pipes are designed to remove any liquid melt which might remain in the passages 50 or 52 when the valve is to be shut-down. For this purpose, the flush-out pipes 95 and 96, as well as the lower flush-out pipes 90 and 92, would be provided with small closure valves (not shown) or stop cocks or the like at their outer ends. These stop cocks or valves would be opened in order to remove any of the material contained in the passages 50 and 52 or the drain pipes 78 and 80.

One of the unique aspects of the present invention is that all of the liquid melt can be completely removed from the valve for purposes of cleaning. In the prior art devices, it was quite difficult to completely remove all of the liquid melt from the valves for purposes of cleaning. In addition, the discharge pipes 78 and 80 can be opened for bleeding off any liquid melt as may be desired, even during operation of the valve. The flush out pipes 90 and 92 can be opened even during operation of the valve when the particular side of the valve with which the drain line is associated is in the closed position.

Extending between the first plate 30 and the second plate 32, as well as the third plate 34, is a vertically disposed generally centrally located pipe or sleeve 98 which has a central bore 100 extending therethrough and which permits communication between the heat regulating chamber 40 and the heat regulating chamber 42. In this way, the heat regulating chambers 40 and 42 with communication through the hollow bore 100 define a total heat regulating chamber 102 which is capable of receiving a heat regulating fluid through a heat regulating inlet pipe 104 introduced into the upper chamber section 40. This same heat regulating fluid is removed from the upper chamber 40 through a heat regulating outlet pipe 106.

Any of a number of well known heat regulating fluids may be employed in connection with the present invention. The heat regulating fluid is designed to maintain the proper temperature of the thermoplastic liquid hot melt. It is important to note in connection with the present invention that the temperature regulating fluid introduced through the inlet pipe 104 can pass through the chamber 40 into the chamber 42 through the central bore 100. In this way, heat regulating fluid provides constant temperature control to the high temperature, high viscosity fluid passing through the valve device V of the present invention.

The lower casing section 38 is also provided with an interiorly threaded sleeve 108 having a removable drain plug 110 threadedly secured thereto for purposes of draining the heat regulating fluid from the chamber 102 including the upper chamber 40 and the lower chamber 42.

In this respect, the heat regulating fluid would be any form of fluid capable of providing a desired temperature to the high viscosity, high temperature fluid passing through the valve device. In essence, this fluid is designed to maintain the same temperature of the high viscosity, high temperature fluid such as the thermoplastic liquid melt. A number of commercially available fluids are available for this purpose including one fluid marketed under the trademark "Dowtherm".

The heat regulating fluid is introduced into the chamber sections 40 and 42 at about 150 psi. On the other hand, the liquid thermoplastic melt or other form of liquid polymer is introduced into the valve device at a system pressure of about 3,000 psi in most situations. It has been found in connection with the present invention that the valve is capable of controlling liquid flow when the liquid polymer has a viscosity of up to 30,000 poise and even higher. Generally, the temperature of the polymer must be maintained at a system temperature of about 600° F., although this temperature may vary depending on the type of fluid being controlled.

Another one of the unique aspects of the present invention is that the liquid polymer is completely heated during its passage through the valve. In this case, all of the metal components which carry the liquid melt are completely in contact with the heat regulating fluid. Not only does the heat regulating fluid cover all of the exposed portions in the upper chamber 40 and in the lower chamber 42, but it also flows through the central bore 100, thereby providing complete heat regulating fluid contact with all of the major surfaces surrounding the liquid melt.

The lower plate 32 is provided with an aperture 112 in alignment with and communicating with the central bore 100 of the sleeve 98. Moreover, the aperture 112 is slightly larger than the central bore 100 so as to expose a shoulder 114 on the lower portion of the sleeve 98, in the manner as illustrated in FIG. 3 of the drawings, and for reasons which will presently more fully appear.

The third or middle plate 34 is provided with a gear segment 120 and may, if desired, be provided with gear teeth on its entire peripheral surface. The third plate 34 is controlled in its movement by means of a pinion gear 122 disposed in meshing engagement with the gear segment 120. The pinion gear 122 extends into the periphery of the recesses 31 and 33 through slots 121 and 123, respectively formed in the upper and lower plates as best seen in FIG. 7. The pinion gear 122 is contained within a casing 124 which is bolted to flange sections 126 and 127 formed on the upper and lower jacket sections 36 and 38, by means of bolts 128. The pinion gear 122 is rotatable within the housing 124 and is mounted on an upstanding shaft 130, the latter being journalled in bearings 132 in the manner as illustrated in FIG. 3 of the drawings. Moreover, the upstanding shaft 130 is keyed to the gear 122 by means of key 134 as illustrated in FIG. 4 of the drawings.

Although not so illustrated, a disc carrying a crank could be secured to the upper end of the shaft 130. In this way, the position of the interior plate 34 can be controlled by merely turning the crank handle through manual actuation. Rotation of the crank handle will cause the gear 122 to rotate, thereby rotating the intermediate plate 34. In this way, it is possible to properly position the ports 54 and 56 with respect to the openings 50 and 58 and the openings 52 and 60 defining the two fluid flow paths.

Referring to FIGS. 2 and 3, it can be observed that the housing 124 is formed by a pair of vertically located plates 140 and 142 which are in marginal registration with each other and are secured together by means of bolts 144. The plates 140 and 142 are integrally provided with flange sections 137 and 139, respectively, for bolting to the flange sections 126 and 127 by the bolts 128. In addition, guide pins or dowels 146 may also be used for purposes of alignment.

It can be observed that the guide pins 146 are insertable into apertures 141 and 143 in the plates 140 and 142 respectively. Moreover, the apertures 143 in the lower plate 142 do not extend completely through to the lower surface of the plate 142. Rather, smaller apertures 145 communicate with the apertures 143 creating shoulders 147 which are engageable by the lower ends of the pins 146. Thus, the plates 140 and 142 can be separated in the same manner as the plates 30 and 32. It is only necessary to tap on the upper head of the pins 146 to separate the two plates 140 and 142 and to insert a small implement, such as a small diameter rod, into the small diameter apertures 145 and force the pins 146 out of the apertures 143. Again, the guide pins 146 would preferably be slip-fitted into the apertures in one of the plates and press-fitted into the apertures in the other of the plates.

The various components forming part of the valve and the other embodiments of the valves of the present invention are preferably formed of a structural metal such as steel, stainless steel, or the like. However, the intermediate plate 34 is preferably formed of aluminum. The intermediate plate could also be formed of stainless steel, ceramics and particularly an aluminum ceramic. The employment of an aluminum intermediate plate is desirable for purposes of fabrication and since it lends to better sealing with upper and lower steel plates. However, it should be understood that other materials of construction could be used in the formation of the valve device as well as the other embodiments of the valve as hereinafter described.

FIG. 8 is a schematic illustration showing a modified means of driving the gear 122 from an automatic control system. In this case, it can be observed that a disc 178 (as shown in FIG. 2) and which is hereinafter described in more detail, is connected to a suitable electric motor 150 which rotates a shaft 152 suitably coupled to the plate 178 to cause rotation thereof. The means for coupling the shaft 152 to the disc 178 is conventional in its construction and, therefore, is neither illustrated nor described in any further detail herein. It can be observed that the motor 152 can be driven by a suitable silicon controlled rectifier (SCR) circuit 154 and which may be controlled from a remote source. In this way, the position of the intermediate plate 34 can be controlled automatically in order to control the flow of fluid passing through the valve.

FIGS. 9 and 9A illustrate a modified form of intermediate plate 156 which may be used in place of the intermediate plate 34. In this case, the plate 156 is longitudinally shiftable and is located intermediate an upper plate 157 and a lower plate 158. Thus, in place of the gear 122, a pair of pinion gears (not shown) would be used to drive the plate 156 in a longitudinal direction by means of racks (also not shown) on opposite longitudinal sides of the plate 156. The upper plate is provided with a rectangular downwardly struck projection or boss 160 which fits in a recess 161 formed in the upper surface of the intermediate plate 156. In like manner, an upwardly struck projection or boss 162 extends from the lower plate and fits within a similar recess 161 on the underside of the intermediate plate 156. The recesses 161 have a length greater than the length of the projections 160 and 162 so as to enable the plate 156 to be slidable relative to the upper and lower plates.

In place of the arcuately shaped slots 86 and 88, two apertures or ports 163 and 164 would be employed, and these ports 163 and 164 extend through the recesses 161. The upper plate 157 is provided with spaced apart openings 165 and 166 which would operate in conjunction with and are capable of being individually but not simultaneously aligned with the ports 163 and 164 in the intermediate plate 156. The lower plate 158 is provided with spaced apart openings 167 and 168 which would operate in conjunction with and are capable of being individually aligned with the ports 163 and 164.

The two ports 163 and 164 would be located so that they proportionally control the flow of fluid through the respective openings 165 and 167 and the openings 166 and 168, much in the same manner as the ports 54 and 56 in the circular slots 86 and 88. FIG. 9A shows the plate 156 in a position where the port 163 is aligned with the openings 165 and 167. Thus, if it is desired to shut off the flow through the passage formed by the openings 165 and 167, the longitudinal plate 156 is shifted to the right so that the port 163 is proportionally cut off from communication with the openings 165 and 167. In like manner, the port 164 in the intermediate plate 156 will become proportionally in greater communication with the openings 166 and 168.

In the arrangement illustrated in FIG. 9A of the drawings, the plate 156 is shifted to the left-most position where the openings 165 and 167 are in communication with each other. It can be observed that the port 164 is shifted completely out of alignment with the openings 166 and 168. In this position, no fluid flow would occur through the openings 166 and 168 in the second fluid flow passage. Shifting the plate 156 to the full right-hand position would stop fluid flow through the openings 165 and 167 and divert the flow through the openings 166 and 168.

FIG. 9B represents a slightly modified form of valve mechanism, but which is similar to the valve mechanism illustrated and described in connection with FIGS. 9 and 9A. In this case, the intermediate plate 156 is also shiftable back and forth with respect to upper and lower plates in a linear direction. However, the valve ports 163 and 164 in the intermediate plate 156, in the embodiment of FIG. 9B, are spaced apart from each other by a distance somewhat greater than the distance between the corresponding valve ports illustrated in FIGS. 9 and 9A. In this latter embodiment of FIG. 9B, the openings 165 and 166 in the upper plate would have circular boses 165' and 166' surrounding the openings 165 and 166, respectively, and which project downwardly in the recess 161 in the upper surface of the intermediate plate 156. It should be understood that the lower plate 158 would similarly have upwardly projecting boses surrounding the openings 167 and 168 in the lower plate and which would project into a corresponding recess 161 on the underside of the intermediate plate 156. In the arrangement as illustrated in FIG. 9B, the intermediate plate 156 is shifted to its right-most position where the opening 165 and the port 163 are in communication. However, if the plate 156 were shifted to its left-most position, the port 164 would be in alignment with the opening 166. FIG. 9B also illustrates the pinion gears 169 which are in meshing engagement with rack segments 169' on opposite sides of the intermediate plate 156. It can be observed that this arrangement operates in a manner very similar to the arrangement illustrated in FIGS. 9 and 9A.

As indicated above, one of the unique aspects of the present invention is that the plates 30 and 32 have their respective lower and upper surfaces relatively planar and the plate 34 has its upper and lower surfaces relatively planar. These surfaces are planar at least around the openings 54 and which thereby avoids the necessity of any form of seal. However, it should be understood that seals, such as metallic seals, and the like could be employed if desired. The same advantage would also hold true with the embodiment as illustrated in FIG. 9 of the drawings.

Another one of the unique aspects of the present invention is that the valve device, after having the heat regulating fluid and the hot melt flushed therefrom, as previously described, can be easily disassembled for purposes of cleaning or repair. In order to disassemble the valve V, the drain plug 110 is removed from the threaded sleeve 108. Thereafter, the housing 124 is removed by simple removal of the bolts 128 as previously described. The various bolts 74 which retain the plates 70 and 72 in connected relationship are thereafter removed. In order to separate the components, an elongate rod or similar implement is inserted through the opened sleeve 108 and engages the shoulder 144 on the sleeve 98. In this way, the upwardly directed force on the sleeve 98 will cause both the upper plate 30 and the intermediate plate 34 to separate from the lower plate 32. Moreover, each of the guide pins 76 are removed in the same manner and as previously described in order to enable separation of the various plates. After separtion of these components, it is thereafter simple to separate the plate 34 from the upper plate 30. Again, it can be observed that the valve can be easily assembled after cleaning or repair.

In place of using an elongte rod to insert in the sleeve 108, it is also possible to use the guide pins. Thus, the guide pins could be provided with a diametrially reduced lower end section which can be inserted into the opened sleeve 108 to engage the shoulder 114 and thereby effect separation of the plates.

As previously described, a pair of valves $V_1$ and $V_2$ may be operated in conjunction. When using the valve $V_2$, this valve is essentially identical to the valve $V_1$, but is merely rotated 180° such that the two outlets from the filters $F_1$ and $F_2$ are introduced into the discharge pipes 78 and 80. The two hot plastic streams are thereupon combined in the manifold 47 and directed out through the inlet pipe 44. In this way, the discharge pipes 78 and 80 would actually function as inlet pipes, and the inlet pipe 44 would actually function as a discharge pipe. Nevertheless, the valve $V_2$ operates in essentially the same manner.

It is also to be noted that the inlet pipe 12 to the valve $V_1$ illustrated in FIG. 1 is equivalent to the inlet pipe 44 illustrated in FIG. 3. In like manner, the outlet pipes 18 and 20 in FIG. 1 are equivalent to the discharge pipes 78 and 80, respectively, in FIG. 3, or otherwise outlet pipes connected to the discharge pipes 78 and 80 in FIG. 3 of the drawings.

The valve V in FIG. 3 and the corresponding figures is illustrated in a vertically disposed position and reference is made to the components thereof when the valve is in the upright or vertically disposed position. However, it should be understood that the valve could be located in any orientation. Thus, in the preferred aspect, the valve V of FIG. 3 would be located in a position where the inlet pipe 44 and the discharge pipes 78 and 80 would be located in a relatively horizontal plane.

For purposes of controlling the two valves in conjunction with each other, the shaft 130 of each of the valves is provided with worm wheel 170 on its upper end as illustrated in FIGS. 1—3. This worm wheel is rotated by a worm 172 which is rigidly secured to and rotatable with a connecting rod 174, in the manner as illustrated in FIGS. 1 and 3 of the drawings. The worm wheel 170 and the worm 172 would normally be included in a conventional housing 176 in accordance with conventional arrangements. The housing 176 could be suitably mounted to the housing 124 and also serve as a means of retaining the connecting rod 174. The housing 176 is not shown in FIG. 3 for purposes of clarity.

Secured to the outer end of the connecting rod is a disc 178 carrying a crank handle as illustrated in FIGS. 1 and 2. In this way, the position of the interior plate 34 can be controlled by merely turning the crank handle 180 through manual actuation. Rotation of the crank handle 180 and the disc 178 will cause the gear 122 to rotate, thereby rotating the intermedite plate 34 in the manner as previously described. While the disc 178 and crank handle 180 are only shown on the lower valve $V_2$ in FIG. 1, it should be understood that this arrangement could be provided on only the upper valve $V_1$ or both valves for that matter.

One of the unique aspects of using the worm gear and worm arrangement with the two valves is that the worm and worm wheel arrangement provide a self-locking action such that the connecting rod 176 can only be rotated through the crank handle 180. Thus, the worm could not be rotatively driven by the worm wheel. However, it should be understood that other forms of gear means or the like could be used to rotate the connecting rod 174, as for example, bevel gears and like arrangements.

By further reference to FIG. 1, it can be observed that the connecting rod 174 extends to the valve $V_2$ and would be connected to the shaft 130 of the valve $V_2$ through a similar construction. In this way, when the gear 122 is rotated in order to control the position of the plate 34, the like gear 122 would be rotated in the similar valve $V_2$ in order to similarly control the position of the plate 34.

FIG. 10 illustrates an arrangement whereby a pair of valves, such as the valves $V_1$ and $V_2$, can have the intermediate plates 34 thereof driven by means of a shiftable bar or so-called "rack" 182. The rack 182 is provided with rack teeth 184 and 186 on opposite sides thereof and rotate pinion gears 188 and 190, respectively. In this case, the pinion gears 188 and 190 would be mounted on the outer ends of each of the upstanding shafts 130. Like pinion gears would be located within the housing 124 on each of the valves and cooperate with the intermediate plates 34 of each of the valves. In this way, the intermediate plate 34 of each of the cooperating valves $V_1$ and $V_2$ can be rotated by means of a simple rack arrangement.

In the arrangement as illustrated in FIG. 10, the two valves would be located in back-to-back arrangement such that the intermediate plates 34 in each of the valves would be rotated in the proper relationship. Moreover, the rack 182 and the pinion gears 188 and 190 would be suitably mounted on portions of the housing of the valves, and, in this case, a housing 192, the latter of which has a pair of upstanding pins 194 shiftable within a guide slot 196 formed in the rack 182.

FIG. 11 also illustrates another embodiment of controlling a pair of valves such as the valves $V_1$ and $V_2$ in conjunctive relationship. In this case, the worm wheel 170 mounted on the upper ends of the shafts 130 in each of the valves would be replaced by simple pinion gears 200. Only one such pinion gear 200 has been illustrated in FIG. 11 of the drawings. In this case, the pinion gears 200 would be rotated by means of a simple shiftable rack bar or so-called "rack" 202 having a rack teeth segment 204. Moreover, the rack bar 202 could be retained in alignment by means of a backing plate or retaining plate 206. It should be understood that the rack bar 202 would extend to the opposite valve and also rotate the pinion gear 200 mounted on the upper end of the shaft 130. It should be understood that the arrangements as illustrated in FIGS. 10 and 11 of the drawings could also be operated by an SCR circuit and motor of the type illustrated in FIG. 8, including the SCR circuit 154 and the motor 150. In this case, the motor would be provided to create a longitudinal shiftable movement of the rack bar 182 of FIG. 10 or the rack bar 202 of FIG. 11.

While the valves of the present invention are uniquely designed for controlling the flow of high viscosity high pressure fluids, such as liquid melts, it should also be understood that the valve arrangement of the present invention can also be used with low pressure and low viscosity fluids, or for that matter, low temperature fluids. In many cases, such as in the control of the flow of monomers, the monomer has a relatively low viscosity such that equivalent to water or mineral oil, although the temperature may be maintained at a relatively high temperature. However, in the case of control of monomer flow, it is not necessary to use a high pressure fluid flow system.

The valve device of the present invention is easily adaptable to control the flow of monomers and other liquids and also divert the liquid flow into two paths in the same manner as previously described. For this purpose, it is preferable to employ an intermediate plate 34 formed of a material capable of providing a sealing action. For example, those materials sold under the commercial designation as "Nylon" or "Teflon" could be employed. In this way, the valve device of the present invention can be easily altered in order to operate with low pressure and low viscosity fluids. Moreover, the valve device of the present invention would still provide for temperature controlling operation. Thus, while the device of the present invention has been specifically designed for the control of high viscosity high pressure fluids, it nevertheless can be observed that the valve device is equally effective with other forms of fluids.

Thus, there has been illustrated and described a unique valve device and a system in which the valve device may be used and which meets all of the objects and advantages sought therefor. It should be understood that any changes, modifications, variations and other uses and applications will become apparent to those skilled in the art after considering this specification and the accompanying drawings. Therefore, any and all such changes, modifications, variations and other uses and applications are deemed to be covered by the invention which is limited only by the following claims.

Having thus described our invention, what we desire to claim and secure by letters patent is:

1. A valve device for controlling flow of a fluid which is temperature controlled during flow through said valve device, said valve device comprising:
   (a) a first plate having at least first and second openings therein for receiving a fluid,
   (b) a second plate having at least first and second openings to receive a fluid passing through the openings of said first plate,
   (c) a shiftable third plate interposed between said first and second plates and having at least first and second openings which are selectively communicatable with the respective first and second openings in the first and second plates when the third plate is shifted to certain fluid flow positions,
   (d) a jacket disposed around portions of said first, second and third plates and forming a heat controlling chamber therein to receive a heat regulating fluid,
   (e) a central shaft extending through said first and second and third plates and permitting shiftable movement of said third plate with respect to said first and second plates, said shaft having a central bore located approximately in the central portion of said heat controlling chamber for said heat regulating fluid to flow therethrough.

2. The valve device of claim 1 further characterized in that said jacket creates an upper heat regulating fluid chamber section and a lower heat regulating fluid chamber section which are in communication through the central bore of said central shaft.

3. The valve device of claim 2 further characterized in that a heat regulating fluid inlet pipe is connected to said jacket and a heat regulating fluid outlet pipe is connected to said jacket for respectively introducing and withdrawing heat regulating fluid from said chamber.

4. The valve device of claim 2 further characterized in that said inlet and outlet pipes are in fluid communication with said upper heat regulatory fluid chamber.

5. The valve device of claim 1 further characterized in that said first and second openings in each of said plates are disposed on opposite sides of said central bore.

6. The valve device of claim 1 further characterized in that said fluid which is controlled is a high temperature, high viscosity fluid.

7. The valve device of claim 6 further characterized in that said third plate has a first surface which engages a mating surface of said first plate in slidable but nevertheless sealable contact therewith, said third plate having a second surface which engages a mating surface of said second plate in slidable but nevertheless sealable contact therewith at least around said first and second openings, the mating surfaces of said first and third plates and the mating surfaces of said second and third plates being sufficiently surface finished at least around said openings so that they form a seal around the openings with respect to the viscosity of the fluid.

8. The valve device of claim 7 further characterized in that said third plate has a first opening which is capable of communicating with the first openings in said first and second plates and a second opening which is capable of communicating with the second openings in said first and second plates, said first and second openings having a size and shape such that said first opening in said third plate permits communication between the first openings in the first and second plates when said second opening in said third plate does not permit communication with the second openings in said first and second plates, and said second opening in said third plate permits communication between the second openings in the first and second plates when said first openings in said third plate does not permit communication with the first openings in said first and second plates.

9. The valve assembly of claim 8 further characterized in that said first and second openings in said third plate are located in slots on each side of said third plate permitting communication respectively with the first openings and second openings in said first and second plates such that the amount of fluid flow through said first openings is inversely proportional to the amount of fluid flow through said second openings relative to the position of said third plate, said first and second plates each having projections which are surface finished and extend into said elongate slots in sealingwise contact therewith.

10. The valve assembly of claim 1 further characterized in that said first and second plates have projections extending into recesses on opposite sides of said third plate, said projections having portions which contact said third plate.

11. A valve assembly for controlling the flow of a liquid capable of hardening when not maintained in a temperature controlled environment, said valve assembly comprising:
   (a) valve body means having an intake manifold formed therein,
   (b) an inlet pipe connected to said body for introducing liquid into said manifold,
   (c) means forming a first liquid passage in said valve body and communicating with the portion of said manifold,
   (d) means forming a second liquid passage in said valve body and communicating with another portion of said manifold forming a pair of liquid flow paths,
   (e) a valve plate shiftable in said body and having a first opening communicatable with said first liquid passage and a second opening communicatable with said second liquid passage for the passage of said liquid,
   (f) said body means having first and second discharge ducts which are communicable with the openings in said plate when said plate is shifted to a proper position,
   (g) a pair of first drain pipes, each being connected to one of said first and second liquid passages for draining the liquid from at least one of said liquid passages and said manifold, and
   (h) a pair of second drain pipes, each being connected to one of said first and second discharge ducts for draining the liquid from at least one of said discharge ducts.

12. The assembly of claim 11 further characterized in that said valve body comprises:
   (a) a first plate having a first and second openings therein and communicable with said first and second liquid passages for the passage of the liquid, said first and second openings in said first plate being capable of selective communication with the first and second openings in said valve plate,
   (b) a second plate having a first and second openings therein and communicating with said first and second discharge ducts for the passage of the liquid plastic, said first and second openings in said second plate being capable of selective communication with the first and second openings in said valve plate.

13. The assembly of claim 12 further characterized in that said valve plate is interposed between and movable between said first and second plates, said valve plate having a first surface which engages a mating surface of said first plate in slidable but nevertheless sealable contact therewith, said valve plate having a second surface which engages a mating surface of said second plate in slidable but nevertheless sealable contact therewith at least around said openings.

14. The assembly of claim 13 further characterized in that said mating surfaces of said first plate and valve plate and the mating surfaces of said second plate and valve plate being sufficiently surface finished at least around said openings so that they form a seal around the openings with respect to the viscosity of the fluid.

15. The assembly of claim 12 further characterized in that said valve assembly comprises:
   (a) a jacket disposed around portions of said first and second plates and said valve plate and forming a heat controlling chamber therein to receive a heat regulating fluid,
   (b) a central shaft extending through said first and second and third plates and permitting shiftable movement of said third plate with respect to said first and second plates, said shaft having a central bore located approximately in the central portion of said heat controlling chamber for said heat regulating fluid to flow therethrough,
   (c) means to introduce heat regulating fluid in said heat controlling chamber, and
   (d) means to withdraw heat regulating fluid from said heat controlling chamber.

16. A valve assembly for controlling the flow of a high viscosity, high temperature fluid, said valve assembly comprising:
   (a) a valve body having an intake manifold,
   (b) a first fluid inlet means and a second fluid inlet means in said valve body for introducing a process fluid into said manifold,
   (c) a first fluid discharge means and a second fluid discharge means in said valve body,
   (d) a first plate having a first opening communicating with said first inlet means and a second opening communicating with said second inlet means,
   (e) a second plate having a first opening communicating with said first discharge means and a second opening communicating with said second discharge means,
   (f) a third plate interposed between and movable between said first and second plates, said third plate having a first surface which engages a mating surface of said first plate in slidable but nevertheless sealable contact therewith, said third plate having a second surface which engages a mating surface of said second plate in slidable but nevertheless sealable contact therewith at least around said first and second openings, the mating surfaces of said first and third plates and the mating surfaces of said second and third plates being sufficiently surface finished at least around said openings so that they form a seal around the openings with respect to the viscosity of the fluid,
   (g) said third plate having a first port which is capable of communicating with the first openings in said first and second plates and a second port which is capable of communicating with the second openings in said first and second plates, said first and second ports having a size and shape such that said first port permits communication between the first openings in the first and second plates when said second port does not permit communication with the second openings in said first and second plates, and said second port permits communication between the second openings in the first and second plates when said first port does not permit communication with the first openings in said first and second plates,
   (h) a gear segment on a portion of said third plate,
   (i) a disc having a gear segment thereon and mating with the gear segment on said third plate for causing shiftable movement of said third plate to permit and stop fluid flow,
   (j) means operatively associated with said disc for causing movement thereof,
   (k) a pair of first drain pipes, each being connected to one of said first and second fluid inlet means for draining the fluid from said fluid inlet means and said manifold,
   (l) a pair of second drain pipes, each being connected to one of said first and second discharge means for draining the fluid from either or both of said discharge means,
   (m) a jacket disposed around portions of said first, second and third plates and forming a heat controlling chamber therein to receive a heat regulating fluid, and
   (n) a central shaft extending through said first and second and third plates and permitting shiftable movement of said third plate with respect to said first and second plates, said shaft having a central bore located approximately in the central portion of said heat controlling chamber for said heat regulating fluid to flow therethrough.

* * * * *